(12) United States Patent
Siep et al.

(10) Patent No.: US 6,519,641 B1
(45) Date of Patent: Feb. 11, 2003

(54) CALCULATOR NETWORK IN WHICH A MASTER CALCULATOR CAN RESTRICT COMMUNICATION BETWEEN CLIENT CALCULATORS IN THE NETWORK

(75) Inventors: Thomas M. Siep, Garland, TX (US); Ronald E. Stafford, Wylie, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/697,808

(22) Filed: Aug. 30, 1996

(51) Int. Cl.[7] ......................... G06F 15/16; G06F 15/173
(52) U.S. Cl. ....................... 709/225; 709/204
(58) Field of Search ............................ 370/422; 348/14, 348/12; 395/200.34, 828; 434/322; 375/206; 379/202; 709/225, 204

(56) References Cited

U.S. PATENT DOCUMENTS

| | | | |
|---|---|---|---|
| 3,676,939 A | 7/1972 | Oberst et al. ............ 35/48 |
| 4,367,485 A | 1/1983 | Hemmie ............... 358/86 |
| 4,466,001 A | 8/1984 | Moore et al. ............ 340/825 |
| 4,700,374 A | 10/1987 | Bini ............... 379/60 |
| 4,763,329 A | 8/1988 | Green ............... 371/11 |
| 4,809,268 A | 2/1989 | Tejima et al. ............ 340/93 |
| 5,038,140 A | 8/1991 | Ikeuchi ............... 340/825 |
| 5,273,437 A | 12/1993 | Caldwell et al. ............ 434/351 |
| 5,561,446 A | 10/1996 | Montlick ............ 345/173 |
| 5,572,582 A | * 11/1996 | Riddle ............... 379/202 |
| 5,640,673 A | 6/1997 | Tanabe ............... 455/12.1 |

* cited by examiner

Primary Examiner—Le Hein Luu
(74) Attorney, Agent, or Firm—Ronald O. Neerings; Wade J. Brady, III; Frederick J. Telecky, Jr.

(57) ABSTRACT

A group of client calculators (18) communicates by determining whether a aster calculator (14) is a member of the group. If the master calculator (14) is present, the client calculators (18) determine whether the master calculator (14) has allowed communication between the client calculators (14). The client calculators may communicate if the master calculator (14) is not present or if the master calculator (14) is present and has allowed communications between other of the client calculators (18).

18 Claims, 3 Drawing Sheets

CALCULATOR NETWORK IN WHICH A MASTER CALCULATOR CAN RESTRICT COMMUNICATION BETWEEN CLIENT CALCULATORS IN THE NETWORK

BACKGROUND OF THE INVENTION

1. Technical Field

This invention relates in general to processing devices and, more particularly, to networks for processing devices.

2. Description of the Related Art

Electronic calculators have evolved significantly since their inception as a general consumer product in the early 1970's. In addition to arithmetic calculations, current day calculators often provide programming and graphing functions. Graphing calculators include a screen which is able to display graphics in addition to alphanumeric characters.

For some time, graphing calculators have been able to communicate to one another through a wired connection. An example of a calculator of this type is the TI-92 calculator produced by Texas Instruments Incorporated of Dallas, Tex. Wired connections may be used, for example, in a classroom setting where problem sets are downloaded from the teacher's calculator to the students' calculators. Once downloaded, the students can use their calculators to solve the problem.

One problem with use of the networked calculators is the lack of control over the communication between students. In some instances, such as when a test is being administered via the network, any communications between students is a problem. On the other hand, it is desirable in other situations to allow student to study in workgroups.

Heretofore, networking schemes for calculators and other processing devices have not supported such flexibility. In some networks, all communication must pass through a master, which controls the communications between calculators. This structure is appropriate for the classroom, but does not provide for communication in other settings, such as the library, where the master is not present. The alternative is a peer relationship where communication is not controlled by a master. This structure fails in the classroom setting where the teacher may wish to restrict communications, for example, during testing.

Therefore, a need has arisen in the industry for a method of flexibly regulating communications between users on a calculator network.

SUMMARY OF THE INVENTION

In the present invention, a group of processing devices communicates by determining whether a processing device designated as a master device is a member of the group. If present, the processing devices determine whether the master device has allowed communication between other processing devices and initiates communication between devices either if the master device is not a member of the group or if the master device is a member of the group and has allowed communications between the processing devices.

The present invention provides significant advantages over the prior art. First, in settings where restrictions on communication are desired, the master processing device can allow or prohibit communications as desired. This is particularly useful in classroom settings. Second, in settings where communication should be unrestricted, the absence of a master device allows the processing devices to communicate freely. Thus, communication between processing devices may be restricted by the teacher in the classroom, without affecting communications outside of the classroom, such as in study groups.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

The present invention is best understood in relation to FIGS. 1–4 of the drawings, like numerals being used for like elements of the various drawings.

Figure 1:
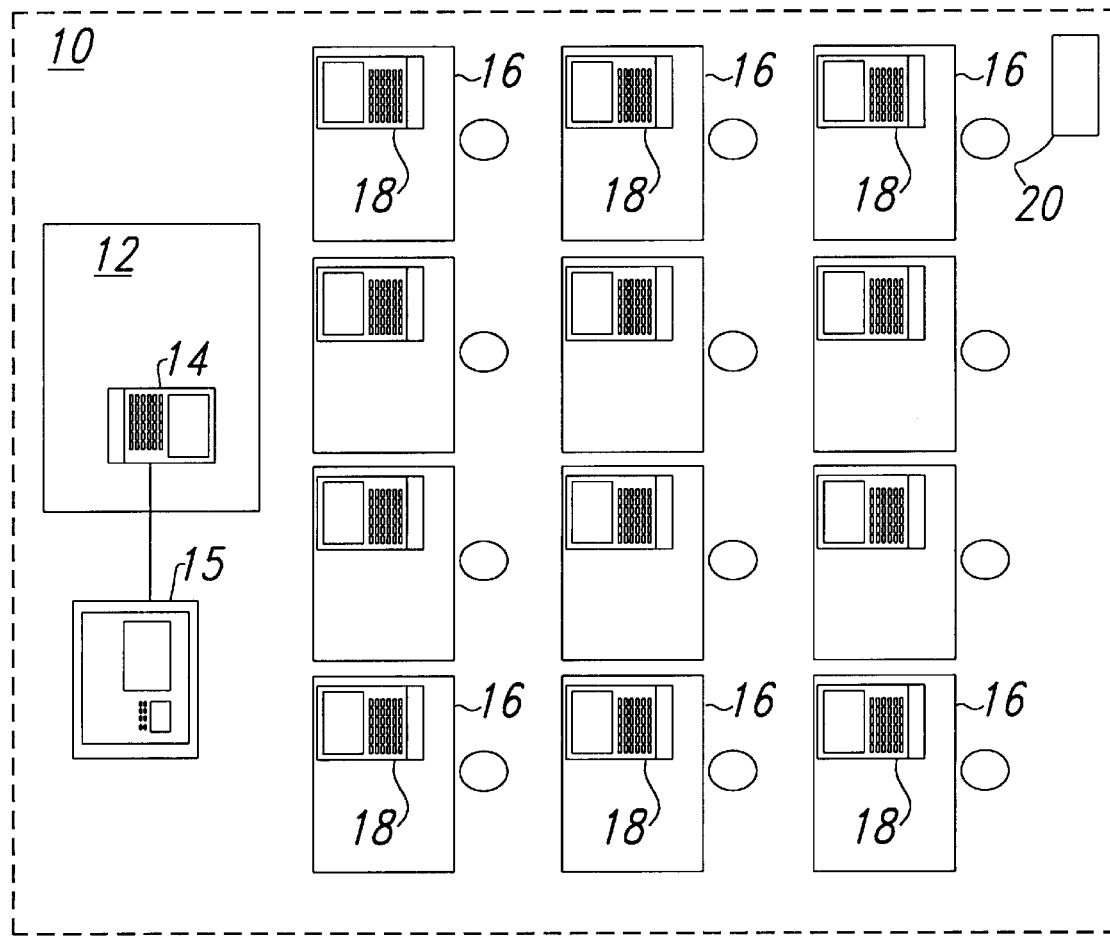
FIG. 1 illustrates a representation of a classroom setting.

FIG. 1 illustrates a representation of a classroom setting. The classroom setting 10 comprises a teacher's desk 12 with a teacher's (master) calculator 14 (connected to a printer 15) and a plurality of student desks 16 with student (client) calculators 18. As described in greater detail hereinbelow, the teacher's calculator 14 and the student calculators have the ability to both send and receive data using radio waves. Wireless networks of this type are discussed in U.S. application Ser. No. 08/707,165, now abandoned, and Ser. No. 08/706,123 now U.S. Pat. No. 6,452,480, to Siep et al, entitled "Passive Wireless Network For Calculators" and "Active Wireless Network For Calculators" respectively, filed concurrently herewith. These applications are incorporated by reference herein. While the embodiment shown herein is a wireless network, wired networks could be used to implement the invention as well.

Figure 2:
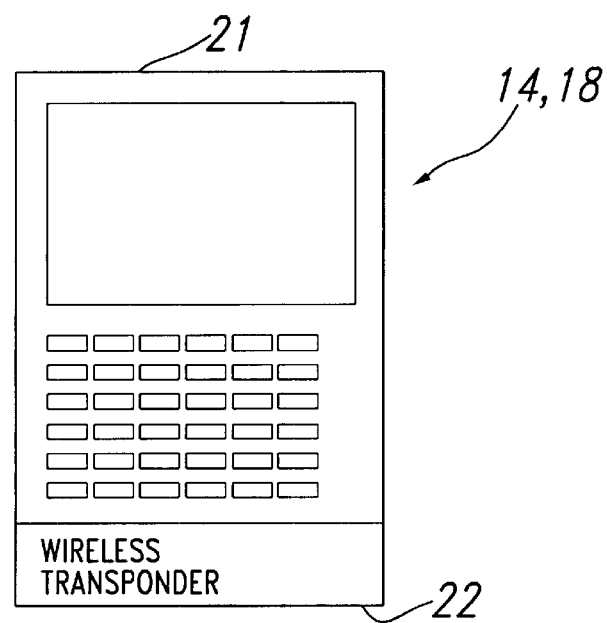
FIG. 2 illustrates a top view of a calculator using wireless transmission for communication with other calculators.

FIG. 2 illustrates a top view of a calculator used in the preferred embodiment for the teacher or master calculator 14 or the student or client calculator 18. The calculators 14 and 18 comprise a processing module 21 and a transponder module 22. The processing module provides the functions associated with a typical calculator or portable computer. The wireless transponder provides the ability to send and receive data over the air, using, for example, radio frequencies or infra-red frequencies. The teacher or master calculator and student or client calculator differ in the operating system which controls communications, as will be discussed in greater detail hereinbelow.

While the network described herein is preferably used in connection with a wireless network, it is suited for use with wired, or mixed wired and wireless, networks as well. Further, while the network is described in connection with graphing calculators, it is understood that the functionality of current-day graphing calculators is similar to that of portable and desktop computers. Hence, the network could be used in connection with these processing devices as well.

In operation, the teacher's calculator 14 has three major functions with regard to communications. First, it checks for data to be sent to the student calculators and sends such data if available. Second, it advertises services which can be used by the student calculators 18. Such services could include, but are not limited to, uploading data from the student calculators 18 and spooling print data from the student calculators to the printer 15. Third, the teacher's calculator 14 controls whether students calculators 18 are allowed to communicate with other student calculators 18.

Figure 3:
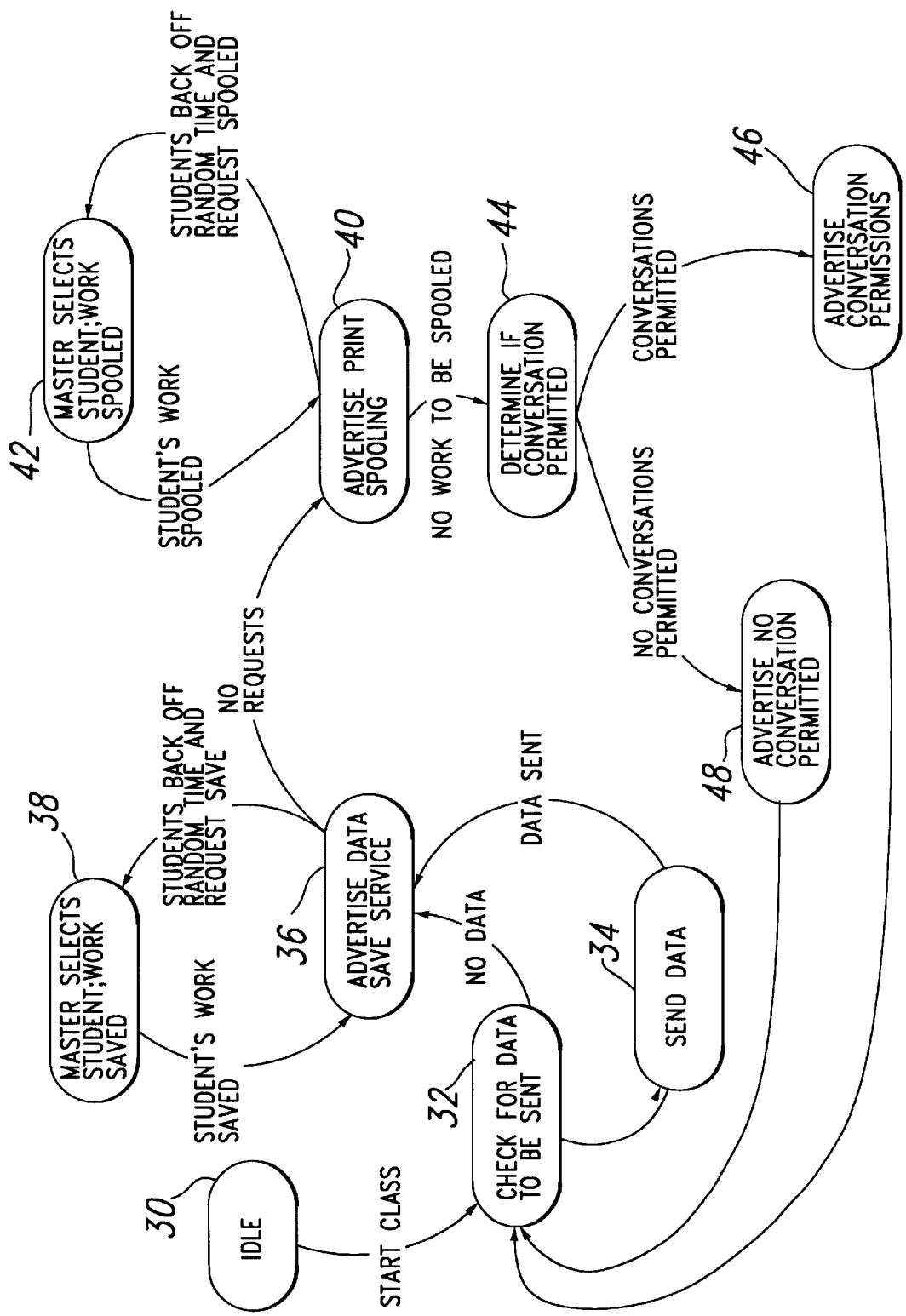
FIG. 3 illustrates a state diagram describing operation of the operating system of a master calculator.

FIG. 3 illustrates a state diagram describing operation of the operating system of the teacher calculator 14. State 30 is the idle state. Once the class starts, the state changes to the state 32, where the operating system determines whether the teacher calculator 14 has any data to send to the student calculators. If so, the state changes to state 34, where the teacher calculator sends data the data. Depending upon the capabilities of the network connecting the teacher calculator 14 and the student calculators 18, the data may be broadcast to all students or individual students may be chosen to receive the data.

After the data is sent in state 34, or if the operating system determined that there was no data to send in block 32, the operating system enters state 36, where it advertises the "Data Save" service. The "Data Save" service allows student calculators 18 to upload data to the teacher calculator 14.

In order to reduce collisions in responding to the Data Save advertisement, each student calculator backs off a random amount of time prior to making a request to save data to the teacher calculator 14. The first calculator to make a request (assuming at least one of the student calculators 18 has data to upload) is granted permission to upload the data in state 38. The grant of permission to a particular student calculator 18 would be made after an appropriate time when all student calculators had been given the chance to respond to the advertisement in state 36. Thereafter, the data of selected student calculator is saved.

Whereas the random back-off method of selecting a student for an advertised service is used herein, other methods of prioritizing between the student calculators could also be used. For example, the teacher calculator 14 could poll each student calculator to determine which, if any, of the student calculators were interested in saving data.

Once the data of the selected student is saved, the state returns to state 36 where the Data Save services are advertised again. Again, all student calculators which have data to save will back off a random amount of time, and the first calculator to respond will be selected to upload data in state 38. The loop between states 36 and 38 continues until no student calculators request the Data Save services within a predetermined time in state 36.

When no student calculator 18 requests the Data Save service in state 36, the state transitions to state 40 where the teacher calculator 14 advertises the Print Spooling service. As before, all student calculators 18 which have data to print make a request to the teacher calculator after waiting a random amount of time. The first student calculator to request to spool print data is selected in state 42, and the print data is uploaded to the printer. The data transfer to the printer could either be direct or via the teacher calculator 14.

After the print data of the selected student calculator is spooled in state 42, the state returns to state 40 where the Print Spooling services are advertised again. The loop between states 40 and 42 continues until no more requests are made in state 40.

When there are no more spooling jobs in state 40, the state transitions to state 44, where the teacher calculator 14 determines whether the student calculators will be allowed to communicate between one another. This determination can be made based on a flag set by a teacher input or controlled by an application program. If conversations are permitted, the state changes to state 46, where the teacher calculator broadcasts a signal advertising that conversations are permitted. In response, the operating system of the student calculators will allow the calculators to communicate with other student calculators 18.

On the other hand, if the operating system determines in state 44 that conversations are not permitted, the state will change to state 48, where the teacher calculator broadcasts a signal advertising that conversations are not permitted. In response, the operating system of the student calculators 18 will not allow the calculators to communicate with other student calculators 18.

After advertising whether conversations are or are not permitted in states 46 and 48, the state returns to state 32. The loop of states 32–48 continues indefinitely.

Figure 4:
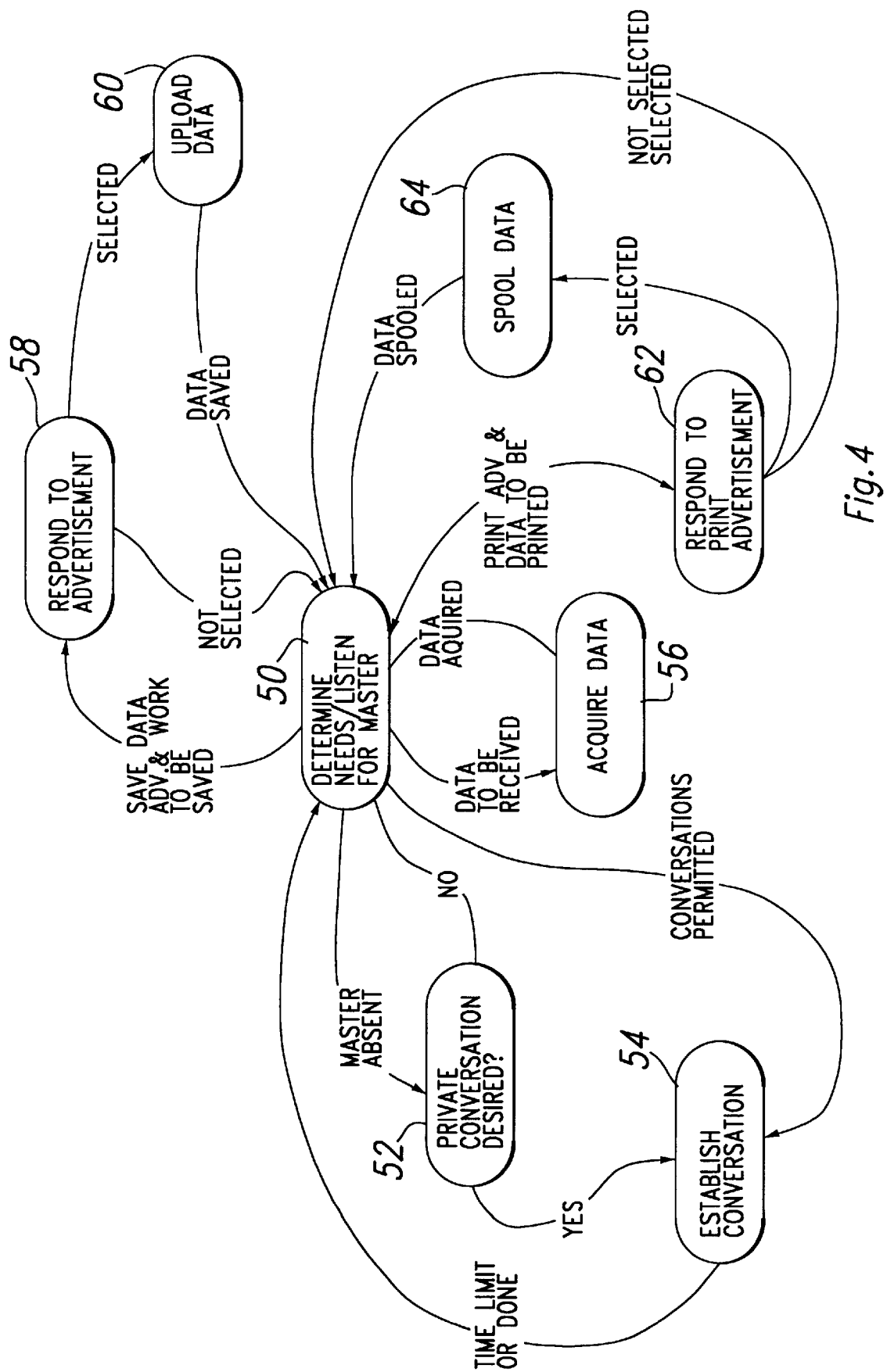
FIG. 4 is a state diagram illustrating operation of the operating systems of the student calculators in connection with communication.

FIG. 4 is a state diagram illustrating operation of the operating system used in each of the student calculators in connection with communication. In state 50, the particular student calculator's needs are determined. For example, the operating system would determine whether the particular student calculator has data to upload to the teacher calculator 14, has data to spool to the printer, or has a pending request to communicate with another student calculator 18. Also in state 50, the operating system listens for communications from the teacher calculator 14, such as signals indicating that the teacher calculator has data to download to the student calculator, or the advertisements for Data Save and Print Spooling, or permissions or prohibitions on conversations with other student calculators 18.

From state 50, the student calculator may (1) receive communications from the teacher calculator or (2) determine that the teacher calculator 14 is not present. If the student calculator 18 determines that the teacher calculator 14 is not present, then the state shifts to state 52, where the student calculator is free to communicate with another student calculator 18. If a private conversation with another student calculator (typically initiated by user input) is desired in state 52, the conversation is established in state 54. If a private conversation is not desired in state 52, the student calculator returns to state 50, where it continues to determine its needs and listen for the master.

When a conversation is terminated, or if the conversation times out in state 54, the student calculator returns to state 50.

Thus, while the master is not present, the student calculators 18 may set up conversations with other student calculators as desired. However, once the teacher's calculator returns in state 50, the private conversations come under control of the teacher's calculator 14.

If a master is present, then a private conversation can be achieved only with the permission of the teacher calculator 14. From state 50, if the teacher calculator 14 signals that conversations are permitted, then the student calculator 18 shifts to state 54, where a conversation can be established. As previously discussed, the state reverts to state 50 once the conversation is terminated or times out.

If the teacher calculator 14 is sending data to the student calculators, the state changes to state 56, where the student calculator 18 acquires the data from the teacher calculator 14. After the data is acquired in state 56, the state returns to state 50, where the need are re-assessed and the student calculator 18 continues to monitor signals from the teacher calculator.

If a Data Save advertisement is received from the teacher calculator 14 in state 50, the state shifts to state 58, provided that the student calculator 18 has data to save. If the student calculator 18 does not have data to save, it remains in state 50. In state 58, the student calculator responds to the advertisement after waiting a random amount of time. If the student calculator is selected to save data in state 58, it shifts to state 60 where the data is uploaded to the teacher calculator 14. If the student is not selected in state 58 (i.e., it was not the first to respond), it returns to state 50. The teacher calculator 14 will continue to repeat the Save Data advertisements until all student calculators with data to save are eventually selected.

Similarly, if a Print Spool advertisement is received from the teacher calculator 14 in state 50, the state shifts to state 62, provided that the student calculator 18 has print data to spool. If the student calculator 18 does not have print data to spool, it remains in state 50. In state 62, the student calculator responds to the advertisement after waiting a random amount of time. If the student calculator is selected to spool data in state 62, it shifts to state 64 where the data is uploaded to the printer 15. If the student is not selected in state 62 (i.e., it was not the first to respond), it returns to state 50. The teacher calculator 14 will continue to repeat the Spool Data advertisements until all student calculators with data to save are eventually selected.

The present invention provides significant advantages over the prior art. First, in settings where restrictions on communication are desired, such as in a classroom setting, the master processing device can allow or prohibit communications as desired. Second, in settings where communication should be unrestricted, the absence of a master device allows the processing devices to communicate freely. Thus, communication between processing devices may be restricted by the teacher in the classroom, without affecting communications outside of the classroom, such as in study groups.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

What is claimed is:

1. A network comprising:
   a master or teacher processing device including circuitry for transmitting data to and receiving data from a plurality of student or client processing devices and for generating signals indicating whether said plurality of client or student processing devices are allowed to communicate between each other; and
   a plurality of client or student processing devices, each client processing device have circuitry to communicate with said master device and to select and communicate with any of the other client processing devices if said master processing device has generated a signal indicating that said client processing devices are allowed to communicate between one another or if said master processing device is not present or otherwise not in communication with said plurality of client processing devices.

2. The network of claim 1 wherein said master and client processing devices are calculators.

3. The network of claim 1 wherein said master and client processing devices can communicate by wireless transmission of signals.

4. The network of claim 1 wherein said master processing device also includes circuitry for transmitting a signal to said client processing device indicating that data may be uploaded from said client processing devices to said master processing device.

5. The network of claim 1 and further comprising a printer in communication with said master processing device, wherein said master processing device also transmits a signal to said client processing devices indicating that print data may be uploaded from said client processing device for printing.

6. The network of claim 1 wherein said master processing device further transmits data to said client processing devices.

7. A network comprising:
   a master or teacher calculator including circuitry for transmitting data to and receiving data from a plurality of student or client calculators and for generating control signals indicating whether said plurality of client or student calculators are allowed to communicate between each other; and
   a plurality of client or student calculators, each of said plurality having circuitry to communicate with said master calculator and to select and communicate with any of the other client calculators responsive to said control signals from said master calculator or if said master calculator is not present or otherwise is not in communication with said client calculators.

8. The network of claim 7 wherein said client calculators and said master calculator are in wireless communication with one another.

9. The network of claim 7 wherein said master calculator can send data to said client calculators.

10. The network of claim 7 wherein said client calculators may upload data to said master calculator.

11. The network of claim 10 wherein client calculators upload data to said master calculator responsive to a signal from said master calculator.

12. The network of claim 10 wherein client calculators upload said print data to said printer responsive to a signal from said master calculator.

13. The network of claim 7 wherein said client calculators may upload print data to a printer.

14. A method of communicating between a group of processing devices at least including a plurality of client processing devices comprising the steps of:
   determining whether said group of processing devices also includes a processing device designated as a member device;
   determining whether the master device, if present, has allowed communications between said client processing devices; and
   selecting and initiating communication by any one of said client processing devices with any other one or more client processing device if a master device is not a member of the group or if a master device is a member of the group and has allowed communications between said client processing devices.

15. The method of claim 14 wherein said step of determining whether the master device has allowed communication comprises the step of receiving signals from said master device which indicate whether communication is allowed.

16. The method of claim 15 and further comprising the step of uploading data to the master device responsive to a signal from said master device.

17. The method of claim 15 and further comprising the step of uploading data to a printer responsive to a signal from said master device.

18. The method of claim 15 and further comprising the step of receiving data from said master device responsive to a signal from said master device.

\* \* \* \* \*